(12) United States Patent
Zhang et al.

(10) Patent No.: US 11,506,090 B1
(45) Date of Patent: Nov. 22, 2022

(54) SYSTEMS AND METHODS FOR CAM PROFILE SWITCH (CPS) ASSEMBLY

(71) Applicant: Ford Global Technologies, LLC, Dearborn, MI (US)

(72) Inventors: Xiaogang Zhang, Novi, MI (US); Steven Wooldridge, Manchester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/653,359

(22) Filed: Mar. 3, 2022

(51) Int. Cl.
| | |
|---|---|
| *F01L 1/14* | (2006.01) |
| *F01L 1/46* | (2006.01) |
| *F01L 13/00* | (2006.01) |
| *F02D 13/02* | (2006.01) |
| *F01L 1/053* | (2006.01) |
| *F02D 13/06* | (2006.01) |

(52) U.S. Cl.
CPC .............. *F01L 1/143* (2013.01); *F01L 1/46* (2013.01); *F01L 13/0015* (2013.01); *F01L 1/0532* (2013.01); *F01L 13/0005* (2013.01); *F01L 2013/001* (2013.01); *F02D 13/06* (2013.01); *F02D 2013/0292* (2013.01); *F02D 2013/0296* (2013.01); *F02D 2200/021* (2013.01)

(58) Field of Classification Search
CPC . F01L 1/0532; F01L 1/143; F01L 1/46; F01L 13/0005; F01L 2013/001; F01L 13/0015; F02D 2013/0292; F02D 2013/0296; F02D 13/06
USPC ................. 123/90.27, 90.48, 90.6, 198 F
See application file for complete search history.

(56) References Cited

U.S. PATENT DOCUMENTS

| | | | | |
|---|---|---|---|---|
| 5,555,861 | A * | 9/1996 | Mayr | F01L 13/0036 123/90.55 |
| 5,782,216 | A * | 7/1998 | Haas | F01L 1/143 123/90.16 |
| 6,167,699 | B1 | 1/2001 | Johnston et al. | |
| 6,457,445 | B1 * | 10/2002 | Sugawara | F01L 1/143 123/90.16 |
| 8,312,852 | B2 | 11/2012 | Yang et al. | |
| 9,279,393 | B2 | 3/2016 | Boyer et al. | |
| 2001/0023675 | A1 | 9/2001 | Lee et al. | |
| 2004/0112313 | A1* | 6/2004 | Matsuura | F01L 1/08 123/90.48 |
| 2007/0240653 | A1* | 10/2007 | Petridis | F02M 26/01 123/90.15 |

(Continued)

FOREIGN PATENT DOCUMENTS

WO     WO-2013045796 A1 *   4/2013   .............. F01L 1/143

OTHER PUBLICATIONS

"Camshaft Profile Switching (CPS)," Youtube Website, Available Online at https://youtu.be/bZmv2zpX8p4, Jun. 1, 2010, 4 pages.

*Primary Examiner* — Jorge L Leon, Jr.
(74) *Attorney, Agent, or Firm* — Vincent Mastrogiacomo; McCoy Russell LLP

(57) ABSTRACT

Methods and systems are provided for actuating an advanced cam profile switch (CPS) assembly. In one example, a system may include a first cylinder and a second cylinder of the CPS assembly that may be independently coupleable to a valve stem via two separate locking mechanisms. A first cam may be selectively engage with the first cylinder and the valve stem and a second cam may be selectively engaged with the second cylinder and the valve stem.

17 Claims, 7 Drawing Sheets

(56) References Cited

U.S. PATENT DOCUMENTS

| | | | | |
|---|---|---|---|---|
| 2009/0151682 A1* | 6/2009 | Kwak | ............... | F01L 1/143 |
| | | | | 123/90.48 |
| 2009/0173296 A1* | 7/2009 | O'Neill | ............... | F01L 1/143 |
| | | | | 123/90.16 |
| 2011/0132305 A1* | 6/2011 | Yang | ............... | F01L 1/143 |
| | | | | 123/90.48 |
| 2012/0060783 A1* | 3/2012 | Woo | ............... | F01L 1/143 |
| | | | | 123/90.48 |

\* cited by examiner

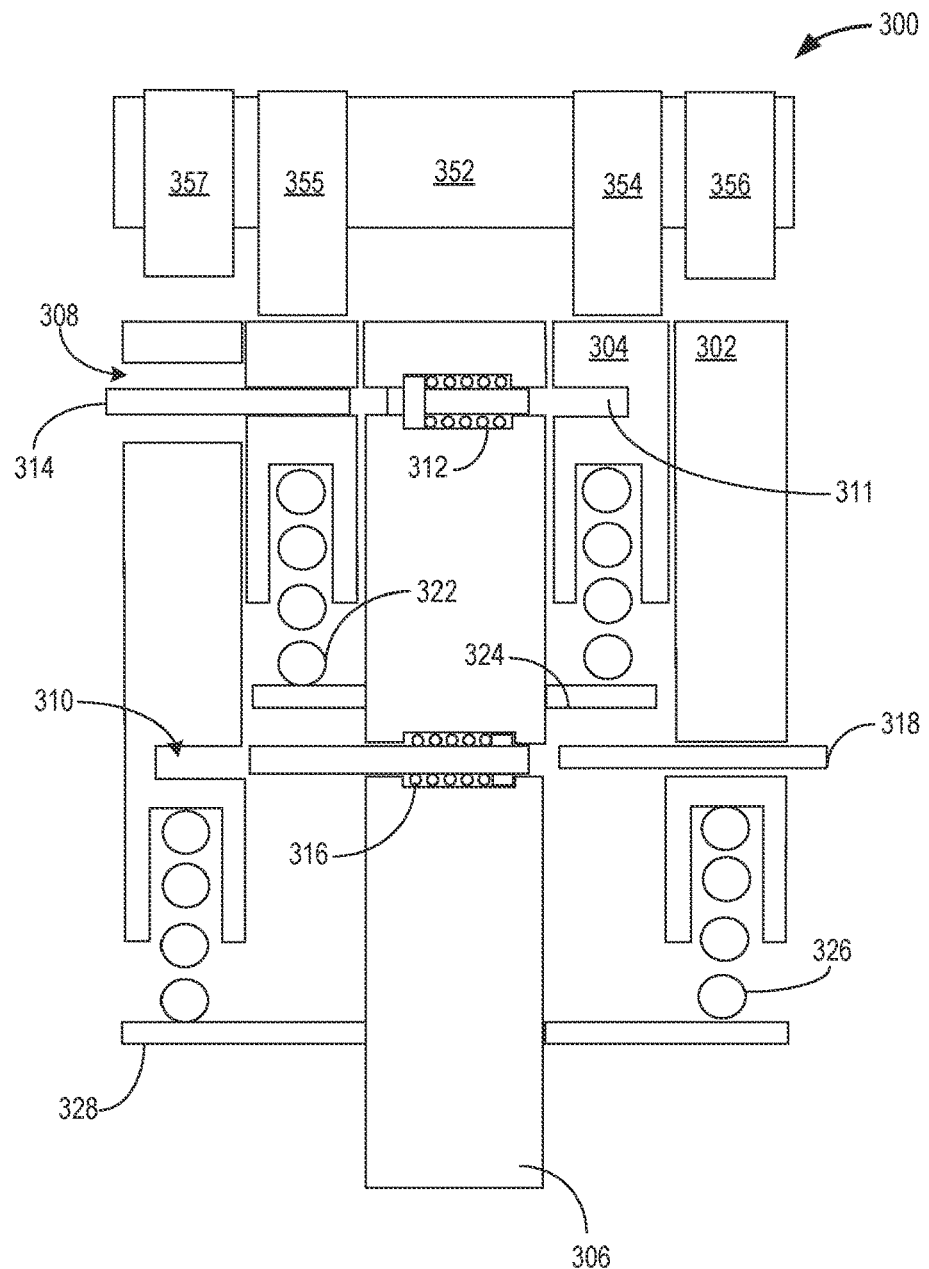
FIG. 3A
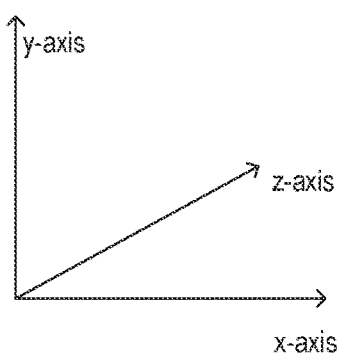
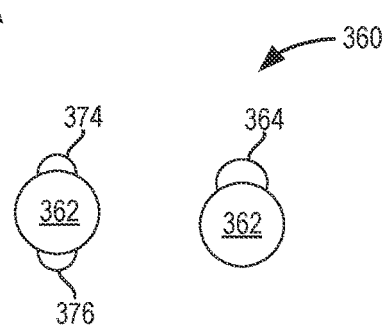
FIG. 3B

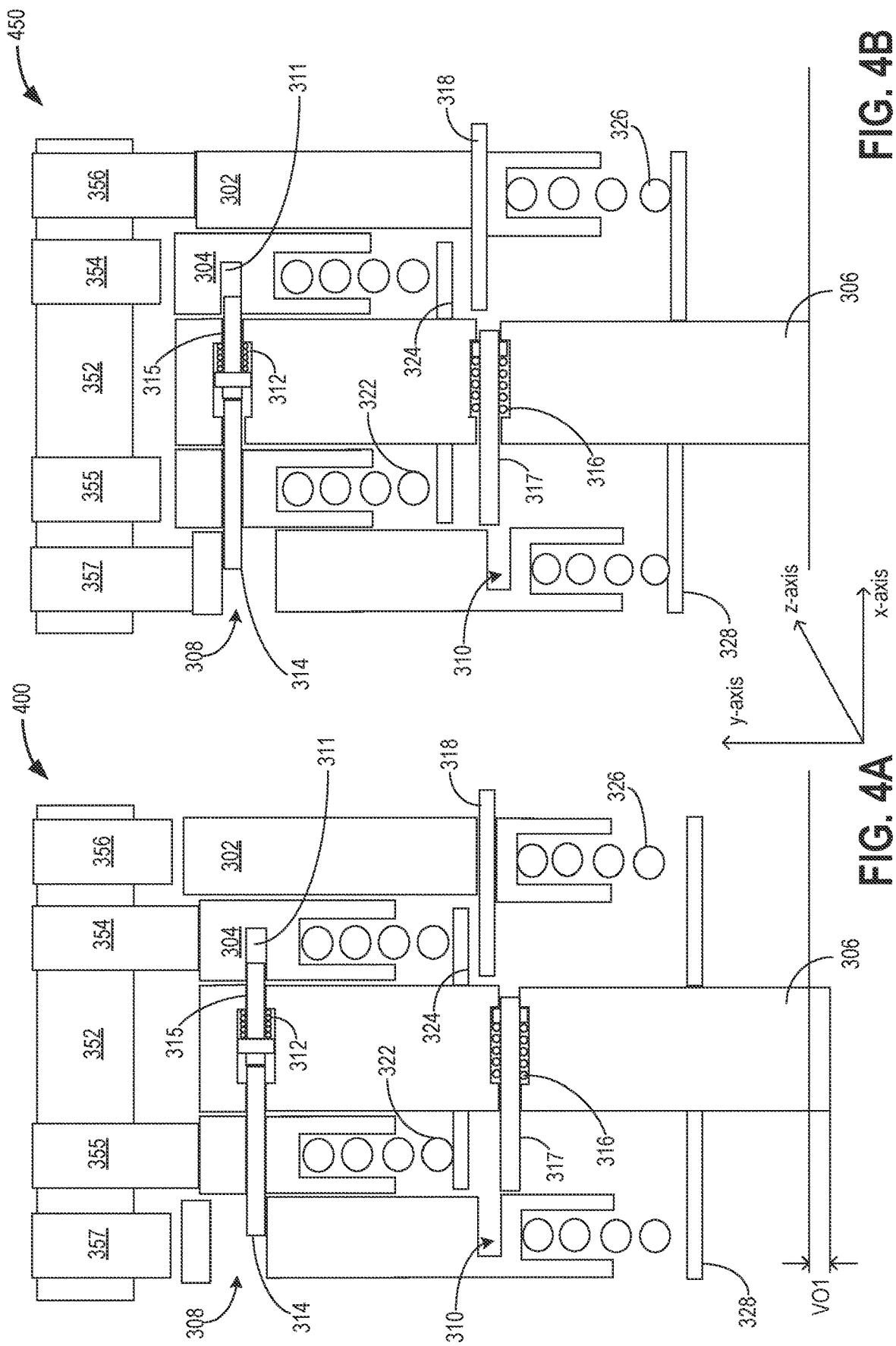

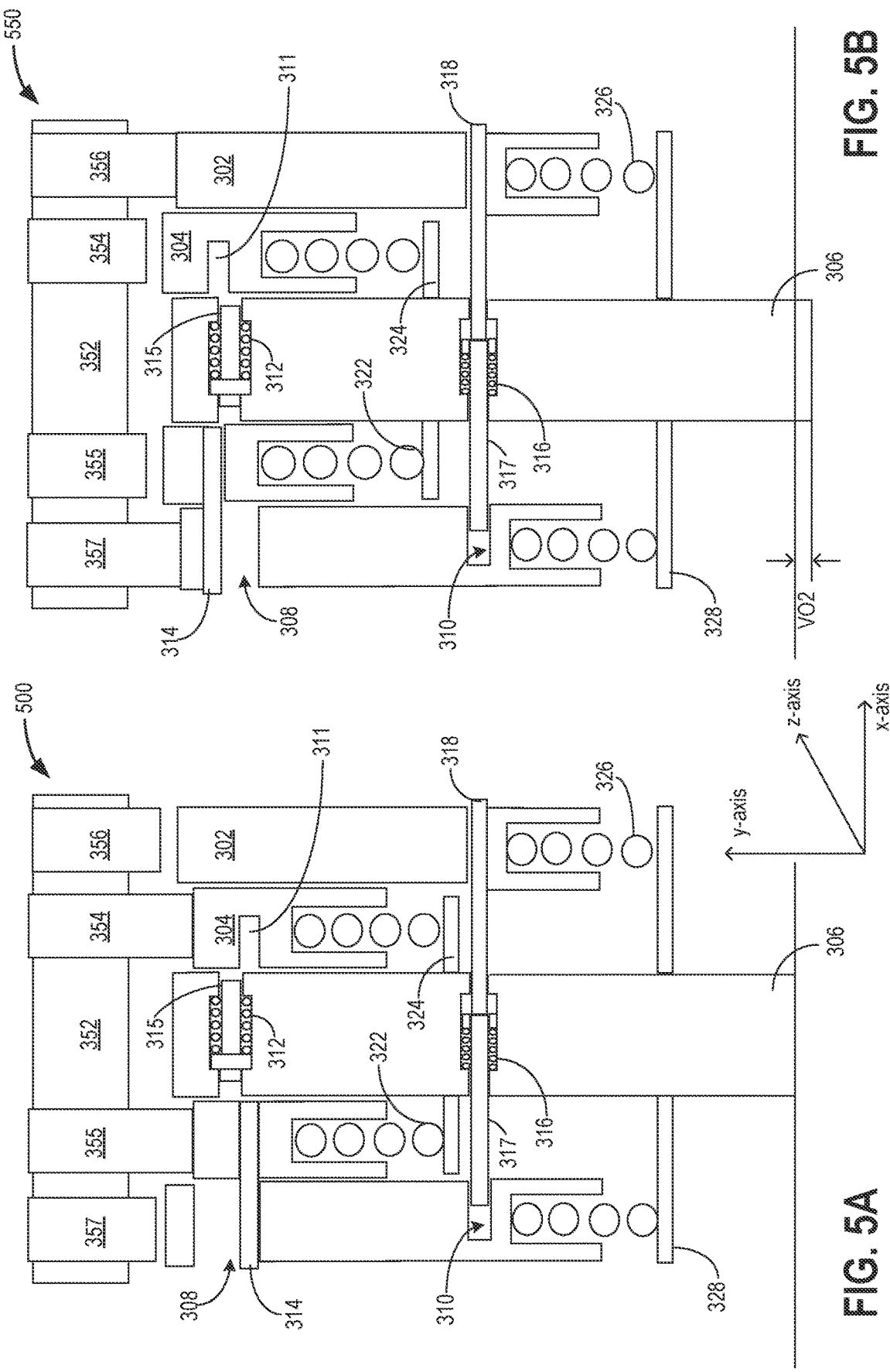

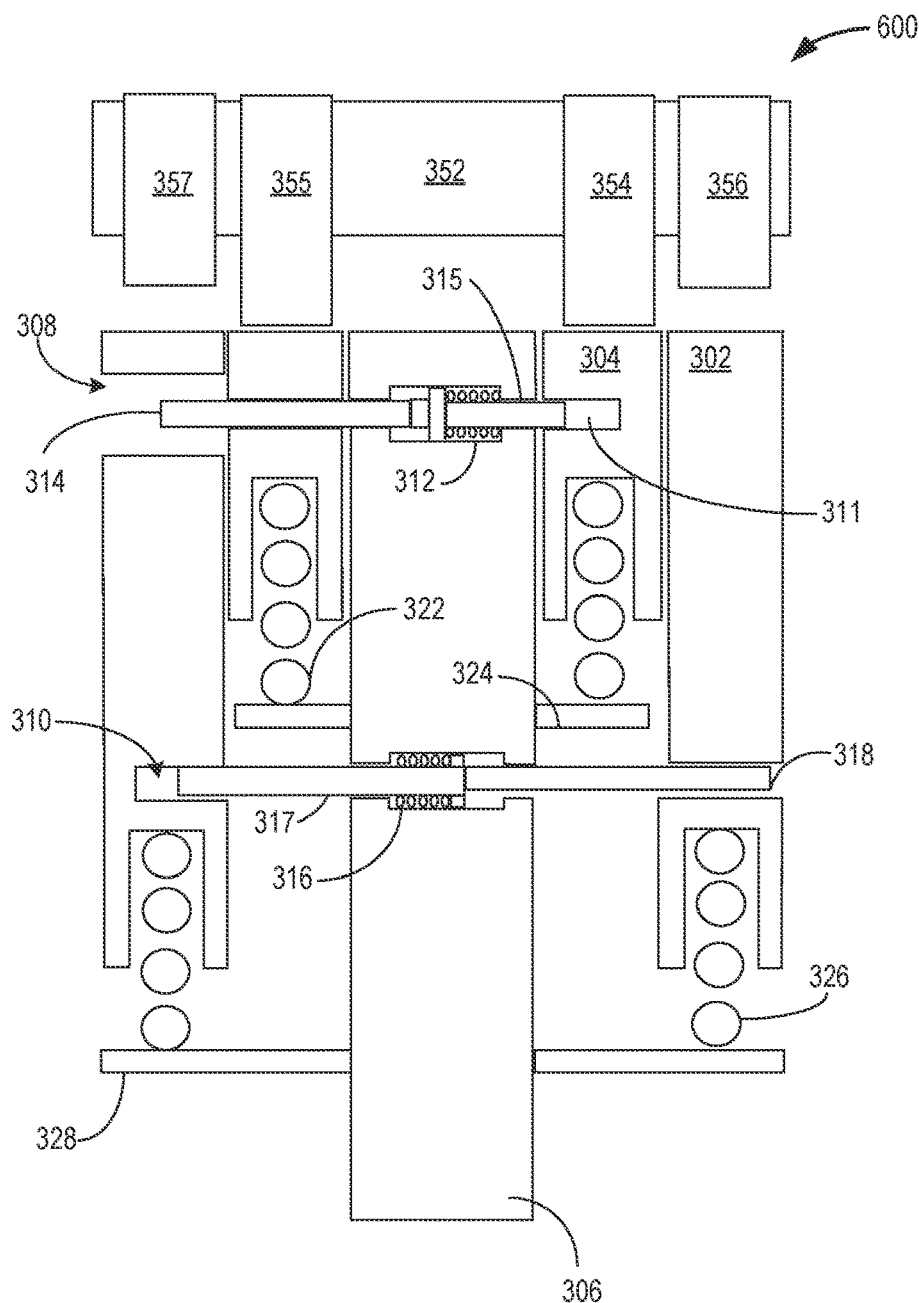
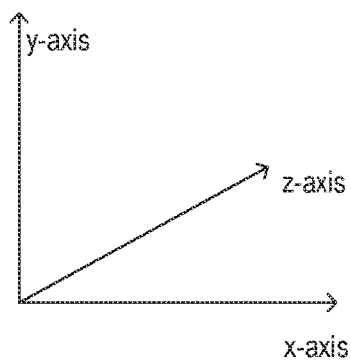
FIG. 6

SYSTEMS AND METHODS FOR CAM PROFILE SWITCH (CPS) ASSEMBLY

FIELD

The present description relates generally to methods and systems for actuating an advanced cam profile switch (CPS) assembly.

BACKGROUND/SUMMARY

Engine emission control systems may include one or more exhaust catalysts such as three-way catalysts, $NO_x$ storage catalysts, and SCR catalysts. At catalyst light-off temperature (e.g., operational temperature), the exhaust catalyst may oxidize and reduce exhaust constituents in an exhaust gas which are then released into the atmosphere. However, during a cold-start of an engine, when a temperature of the exhaust catalyst is below the light-off temperature, the exhaust catalyst may not be able to effectively treat the reactive constituents of the exhaust gas, and as a result, cold-start emissions may increase and the toxic constituents in the exhaust gas may be directly released into the atmosphere.

One way to reduce cold-start emissions is to increase exhaust temperature and decrease the time taken by the exhaust catalyst to reach light-off temperature. One example approach to increase temperature in the exhaust passage is provided by Johnston in U.S. Pat. No. 6,167,699. Therein, the engine includes a secondary air injection system including a pump capable of supplying air to the exhaust manifold.

However, the inventors herein have recognized potential issues with such a system. As one example, inclusion of a separate secondary air injection system, including a dedicated pump for air supply to the exhaust passage, may add to the cost and weight to the vehicle. Inclusion of the pump may also add to the packaging concerns for the engine. The dedicated pump is only used during engine cold-starts, and may not be useful during other engine operating conditions.

In one example, the issues described above may be addressed by a cam profile switch (CPS) assembly, the system comprising: a first tappet cylinder; a second tappet cylinder; a first cam configured to engage the first tappet cylinder; a second cam configured to engage the second tappet cylinder; a first locking mechanism configured to selectively and independently couple the second tappet cylinder to a valve stem; and a second locking mechanism configured to selectively and independently couple the first tappet cylinder to the valve stem, wherein the first locking mechanism includes a first spring lock configured to slide along a first opening in the valve stem and a third through hole in the second tappet cylinder, and wherein the second locking mechanism includes a second spring lock configured to slide along a second opening in the valve stem and a second through hole in the first tappet cylinder. In this way, by independently adjusting cam profiles for intake and exhaust valves of an engine cylinder, exhaust heating may be expedited.

As one example, a tappet of an engine valve system may include an advanced cam profile switch (CPS) assembly. The valve system may include two cam profiles, a first cam and a second cam that may be independently coupled and decoupled with a valve stem. The CPS assembly may include an outer, hollow cylinder used to couple the first cam with the valve stem via a first locking mechanism, and a central, hollow cylinder used to couple the second cam with the valve stem via a second locking mechanism. During a cold-start condition, the CPS assembly may be operated in a first mode with the first cam used to actuate the valve while the second cam is deactivated. Upon a desire to reduce fuel usage in a hot engine, the CPS assembly may be operated in a second mode with the second cam used to actuate the valve while the first cam is deactivated. Upon receiving a request to deactivate the engine cylinder, the CPS assembly may be operated in a third mode with each of the first cam and the second cam deactivated. During operation of a hot engine, in order to reduce emissions and improve fuel economy, the CPS assembly may be operated in a fourth mode with each of the first cam and the second cam actively used to actuate the valve.

In this way, by including a CPS system in a tappet of an engine valve system, it is possible to independently use different cam profiles to open the valve to varying degrees as desired. By using two concentric hollow cylinders and independent locking mechanisms, it is possible to selectively couple and decouple one or both cams with a valve stem. The technical effect of adjusting cam profiles to independently control different valves of a cylinder to different levels of opening based on engine operating conditions. By using different cam profiles for intake and exhaust valves in a cylinder during a cold-start, exhaust heating may be improved, and attainment of catalyst light-off may be expedited. Overall, by using the CPS assembly to adjust cam profiles used to open valves, fuel economy and emissions quality may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows details of the CPS assembly in a first configuration.

FIG. 3B shows an example configuration of a first cam and a second cam of the CPS assembly.

FIG. 4A shows details of the CPS assembly in a second configuration with an associated valve open.

FIG. 4B shows details of the CPS assembly in the second configuration with the associated valve closed.

FIG. 5A shows details of the CPS assembly in a third configuration with an associated valve closed.

FIG. 5B shows details of the CPS assembly in the third configuration with the associated valve open.

FIG. 6 shows details of the CPS assembly in a fourth configuration.

DETAILED DESCRIPTION

Figure 1:
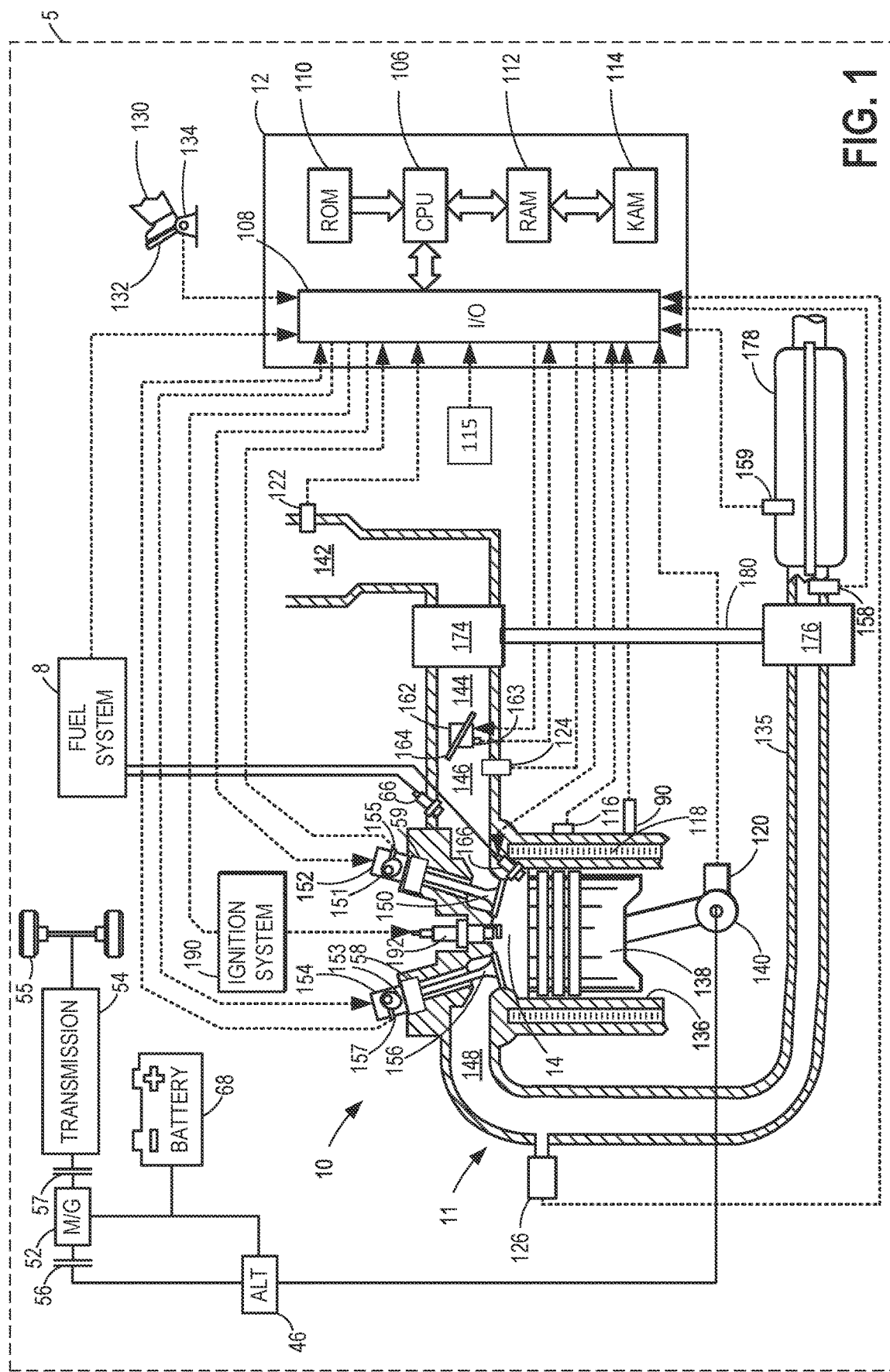
FIG. 1 shows one cylinder of an engine system including an advanced cam profile switch (CPS) assembly.
Figure 2:
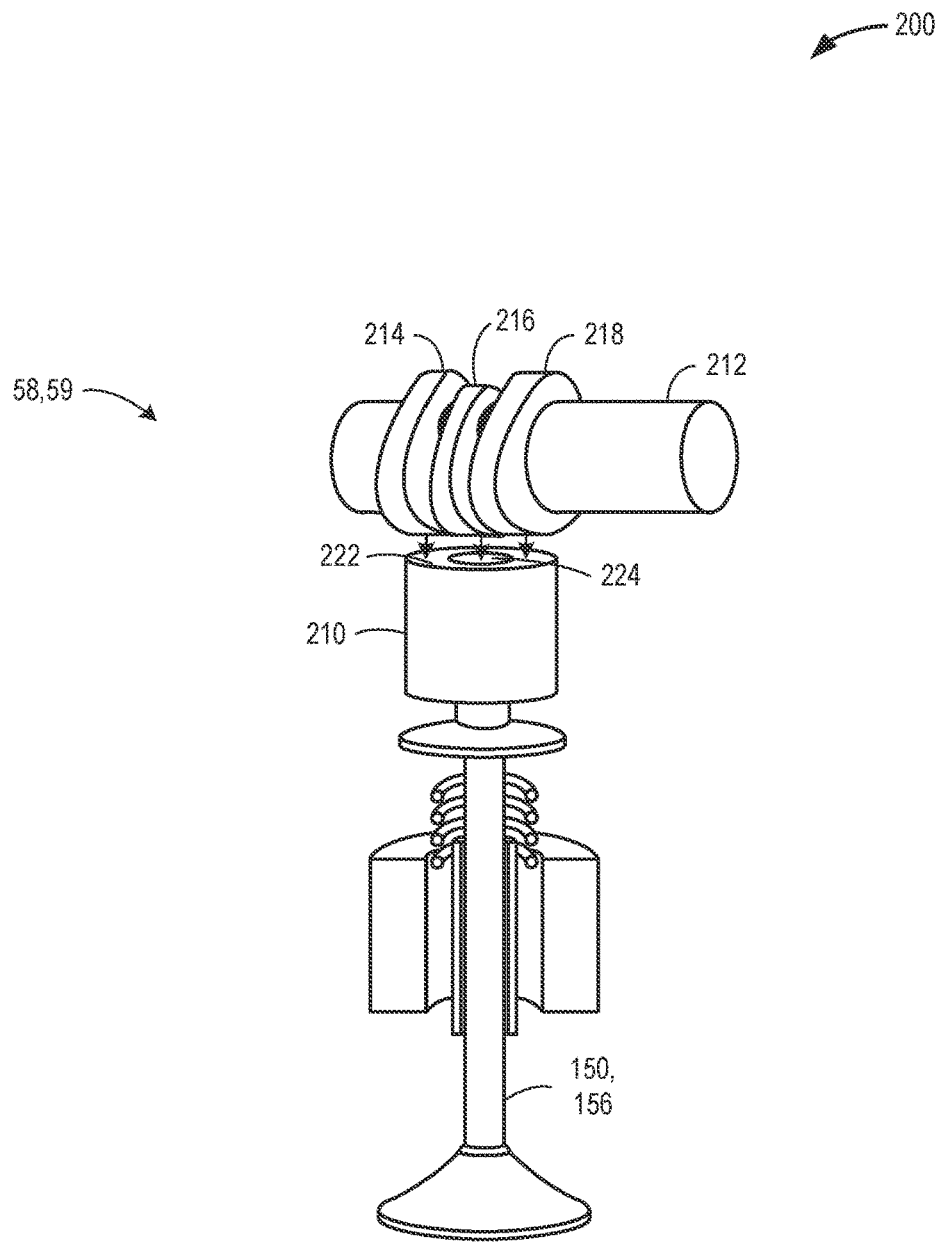
FIG. 2 shows an example of an engine valve coupled to the CPS assembly.

The following description relates to systems and methods for operating an advanced cam profile switch (CPS) assembly based on engine operating conditions including a cold-start condition. The CPS assembly may be included in an engine of a hybrid vehicle as shown in FIG. 1. The CPS assembly may be part of a tappet of an engine valve system, as shown in FIG. 2. Details of the CPS assembly in different possible configurations are shown in FIGS. 3A-6. The CPS assembly may be operated according to the method of FIG. 7 based on engine operating conditions.

Turning now to the figures, FIG. 1 depicts an example of a combustion chamber 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via a driver demand pedal 132. In this example, driver demand pedal 132 includes a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The transmission 54 may include a transmission pump powered by engine power and/or motor power. The transmission pump may be configured to flow transmission fluid through components of the transmission for lubrication and cooling. As further elaborated in FIG. 2, the transmission pump may be used to operate an air compression system.

Engine 10 may be rotated via electric machine 52 during starting or when engine 10 is operated as an air pump. Alternatively, a starter motor (not shown) may rotate engine 10 during starting or when engine 10 is operated as an air pump. The starter motor may engage crankshaft 140 via a flywheel (not shown).

The powertrain may be configured in various manners, including as a parallel, a series, or a series-parallel hybrid vehicle. Further, engine 10 and electric machine 52 may be coupled via a gear set instead of a clutch in some configurations. In electric vehicle examples, a system battery 68 may be a traction battery that delivers electrical power to electric machine 52 to provide torque to vehicle wheels 55. In some examples, electric machine 52 may also be operated as a generator to provide electrical power to charge system battery 68, for example, during a braking operation. It will be appreciated that in other examples, including non-electric vehicle examples, system battery 68 may be a typical starting, lighting, ignition (SLI) battery coupled to an alternator 46.

Alternator 46 may be configured to charge system battery 68 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Combustion chamber 14 of engine 10 can receive intake air via a series of intake passages 142 and 144 and an intake manifold 146. Intake manifold 146 can communicate with other cylinders of engine 10 in addition to combustion chamber 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to combustion chamber 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 may be a three-way catalyst or an oxidation catalyst. Exhaust manifold 148, emissions control device 178, exhaust gas sensor 126, and temperature sensors may be included in engine exhaust system 11.

Each cylinder of engine 10 may include one or more intake valves and one or more exhaust valves. For example, combustion chamber 14 is shown including at least one intake poppet valve 150 and at least one exhaust poppet valve 156 located at an upper region of combustion chamber 14. In some examples, each cylinder of engine 10, including combustion chamber 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, combustion chamber 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

Cam actuation systems 152 and 154 may each include advanced cam profile switch (CPS) assembly 58 and 59 which may be used to switch between different lift profiles of the respective valves based on the various lobes of the cam(s). CPS assemblies may be operated by controller 12 to vary valve operation. More particularly, controller 12 may control operation of the CPS assemblies to affect valve lift and/or timing.

In one example, the engine valve(s) may be actuated either by a high or low lift cam profile depending on the selected combustion mode. The low lift cam profile may be used to trap a high level of residual (exhaust) gas in the combustion chamber. The trapped gasses promote compression or auto-ignition by increasing the initial charge temperature, in some examples. However, in a spark ignition mode (either high or low loads) the high lift cam profile may be used.

During a first condition, the CPS assembly may be operated in a first mode with only a second tappet cylinder coupled to a valve stem, a first tappet cylinder decoupled from the valve stem, and a second cam active, and during a second condition, the CPS assembly may be operated in a second mode with only the first tappet cylinder coupled to the valve stem, the second tappet cylinder decoupled from the valve stem, and a first cam active. During a third condition, the CPS assembly may be operated in a third mode with each of the first tappet cylinder and the second tappet cylinder decoupled from the valve stem, and during a fourth condition, the CPS assembly may be operated in a fourth mode with each of the first tappet cylinder and the second tappet cylinder coupled to the valve stem. The first condition may include a cold-start condition, the second condition may include a desire for increased fuel efficiency, the third condition may include a request for deactivation of the engine cylinder including the valve stem, and the fourth condition may include a higher than threshold engine temperature. During the first condition, a lift from the second cam may push down the only second tappet cylinder and the valve stem to open a valve coupled to the valve stem, and during the second condition, another lift from the first cam may push down only the first tappet cylinder and the valve stem to open the valve. During the third condition, each of the first cam and the second cam may be inactive and the valve stem may not pushed be down by the first cam or the second cam, and during the fourth condition, each of the first cam and the second cam may be active and the valve stem may be pushed down successively by each the first cam of the second cam. The first tappet cylinder and the second tappet cylinder of the CPS assembly may not be fueled or receive spark. As such, combustion does not occur in the cylinders of the CPS assembly.

Each combustion chamber of engine 10 may include a spark plug 192 for initiating combustion when the engine is configured to combust gasoline or petrol. However, spark plug 192 may be omitted when engine 10 is configured to combust diesel fuel. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, combustion chamber 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to combustion chamber 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into combustion chamber 14. While FIG. 1 shows fuel injector 166 positioned to one side of combustion chamber 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; a catalyst inlet temperature from a temperature sensor 158 coupled to exhaust passage 135; a catalyst temperature from temperature sensor 159; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations via sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, the controller may receive input from and provide data to human/machine interface 115. In one example, human/machine interface 115 may be a touch screen device, a display and keyboard, a phone, or other known device.

As described above, FIG. 1 shows only one combustion chamber of a multi-combustion chamber engine. As such, each combustion chamber may similarly include its own set of intake/exhaust valves, fuel injector(s), spark plug, etc. It will be appreciated that engine 10 may include any suitable number of combustion chambers, including 2, 3, 4, 5, 6, 8, 10, 12, or more combustion chambers. Further, each of these combustion chambers can include some or all of the various components described and depicted by FIG. 1 with reference to combustion chamber 14.

Turning now to FIG. 2, one example of an engine valve coupled to the advanced cam profile switch (CPS) assembly 58 and 59 for use with engine system 10 is shown. Camshaft 212 may include cam lobes 214, 216, 218 which may define different lift profiles. Specifically, in this example, cam lobes 214 and 218 may have identical lift profiles and cam lobe 216 may have a different profile. In particular, cam lobes 214 and 218 may have a high lift profile and cam lobe 216 may have a low lift profile. CPS assembly 58, 59 may include a switchable tappet 210, depicted in FIG. 3A, which may interact with multiple cam lobes 214, 216, 218 of camshaft 212. In particular, cam lobes 214 and 218 may interact with an outer top surface of outer section 222 of switchable tappet 210 and cam lobe 216 may interact with a central top surface of central section 224 of switchable tappet 210.

The CPS assembly may include a first tappet cylinder and a second tappet cylinder independently coupleable to a valve stem via two locking mechanisms, and a first cam (such as cam lobes 214 and 218) configured to engage with the first tappet cylinder and a second cam (such as cam lobe 216) configured to be engaged with the second tappet cylinder. An example tappet cylinder is shown in FIG. 2. The tappet cylinder is different than the combustion chambers of the engine. The tappet cylinder may be positioned outside of the combustion chamber of the engine and may not perform combustion.

Each of the first tappet cylinder and the second tappet cylinder may be hollow, and the valve stem may be coupled to an intake valve or an exhaust valve (such as valves 150, 156) of an engine cylinder. The valve stem, the first tappet cylinder, and the second tappet cylinder may be concentric with a first diameter of the first tappet cylinder being larger than a second diameter of the second tappet cylinder. The second tappet cylinder may enclose the valve stem, and the first tappet cylinder may enclose each of the second tappet cylinder and the valve stem. The two locking mechanisms may include a first locking mechanism configured to couple the second tappet cylinder to the valve stem and a second locking mechanism configured to couple the first tappet cylinder to the valve stem. The first locking mechanism may include a first actuator axle slidable along a first through hole in the first tappet cylinder and a first spring lock slidable along a first opening in the valve stem and a through hole in the second tappet cylinder while the second locking mechanism may include a second actuator axle slidable along a second through hole in the first tappet cylinder and a second spring lock slidable along a second opening in the valve stem and the second through hole in the first tappet cylinder.

While this example shows an overhead cam engine with a tappet coupled to the valve stems, tappets may also be used with a pushrod engine, and a collapsible tappet may thus be coupled to a pushrod.

Further, the diagram of FIG. 2 shows just one cylinder valve of engine 10, where the engine may be a multiple cylinder engine with each cylinder having multiple valves (intake and/or exhaust) configured the same as, similar to, or different from the one shown in FIG. 2.

FIG. 3A shows a cross-sectional view 300 of a CPS assembly (such as CPS assembly 58 or 59) within a tappet in a first configuration. The CPS assembly may include two concentric hollow cylinders, a first (outer) cylinder 302 and a second (inner) cylinder 304 enclosing a valve stem 306. The valve stem 306 may be a valve stem of an intake or an exhaust valve coupled to intake or exhaust ports of an engine combustion chamber. Camshaft 352 may include cam lobes 354, 355, 356, and 357 which may define different lift profiles. In this example, cam lobes 356 and 357 may be identical in lift profile, and may be positioned directly above (along the y-axis) the first tappet cylinder 302. The cam lobes 356 and 357, together termed as the first cam, may be activated together upon engagement of the first tappet cylinder 302 with the valve stem 306. Cam lobes 354 and 355 may be identical in lift profile, and may be positioned directly above (along the y-axis) the second tappet cylinder 304. The cam lobes 354 and 355, together termed as the second cam, may be activated together upon engagement of the second tappet cylinder 304 with the valve stem 306.

In one example, the first cam and the second cam may include different numbers of lobes. For example, the second cam may include lobes 354 and 355. The lobes 354 and 355 may each include only a single lobe configured to adjust a position of the second tappet cylinder 304 and therefore an intake valve or an exhaust valve. The lobes 356 and 357, which are associated with the first cam, may each include two or more lobes. In one example, the first cam may follow a four-stroke engine operation with one instance of the intake valve opening and one instance of the exhaust valve opening over a 720 CA engine cycle. The second cam may follow a two-stroke engine operation with two instances of the intake valve opening and two instances of the exhaust valve opening over a 720 CA engine cycle.

In the example of FIG. 3B, the first cam may include a single lobe 364 arranged along a camshaft 362. The second cam may include a two lobes, including a first second lobe 374 and a second-second lobe 376. In one example, the single lobe 364 is larger than each of the first second lobe 374 and the second-second lobe 376.

Returning to FIG. 3A, a first, lower disc 328 and a second, upper disc 324 may be coupled to the valve stem 306. The second tappet cylinder 304 may be positioned proximal to the valve stem 306 and may extend (along the y-axis) up to the second, upper disc 324. The first tappet cylinder 302 may be positioned more distal to the valve stem 306, relative to the second tappet cylinder 304, and may extend (along the y-axis) up to the first, lower disc 328.

The first tappet cylinder 302 may include a first through hole 308 cut along the x-axis along one side of the first tappet cylinder 302 extending from a periphery of the first tappet cylinder 302 to the outer periphery of the second tappet cylinder 304. The first tappet cylinder 302 may further include a second through hole 310 cut along the x-axis along one side of the first tappet cylinder 302 extending from the outer periphery of the second tappet cylinder 304 towards the outer periphery of the first tappet cylinder 302 (but not reaching the outer periphery of the first tappet cylinder 302 like the first through hole 308). The diameter of the second through hole 310 may be smaller than the diameter of the first through hole 308. The first through hole 308 and second through hole 310 may be substantially parallel to each other and of substantially similar width (along y-axis). The first through hole 308 may be closer to the camshaft 352 relative to the second through hole 310.

The second tappet cylinder 304 may include a third through hole 311 cut along the x-axis. The third through hole 311 may extend along one side of the second tappet cylinder 304 from a periphery of the second tappet cylinder 304 (proximal to the valve stem 306) to the periphery of the first tappet cylinder 302 and along another side from the periphery of the valve stem 306 towards the outer periphery of the first tappet cylinder 302. The first through hole 308 in the first tappet cylinder 302 may horizontally align (along x-axis) with the third through hole 311. The third through hole 311 may extend in a direction opposite to a direction of the first through hole 308 and the second through hole 310. The third through hole 311 extends toward the first tappet cylinder 302 without touching or contacting the first tappet cylinder 302.

A first spring 326 may be positioned within a cutout of the first tappet cylinder 302. The first spring 326 may extend from below the second through hole 310, relative to a direction of gravity parallel to the y-axis, to the first disc 328. A second spring 322 may be positioned within a cutout of the second tappet cylinder 304 and may extend from below the third through hole 310 to the second disc 324.

The CPS may include two locking mechanisms, a first locking mechanism configured to couple the second tappet cylinder 304 to the valve stem 306 and activate the second cam 355, and a second locking mechanism configured to couple the first tappet cylinder 302 to the valve stem 306 and activate the first cam 357. Each of the first locking mechanism and the second locking mechanism may be independently actuated thereby making it possible to activate only one cam at a time, activate both cams together, and deactivate both cams.

The first locking mechanism may include a first, top actuator axle 314 and a first, top spring lock 312 coupled to a first, top pin lock 315. The first actuator axle 314 may be positioned within the first through hole 308 and is slidable along the first through hole 308 in the direction of the x-axis. The first spring lock 312 may be positioned within an opening in the valve stem 306 in line with the first through hole 308 (along the x-axis). The first actuator axle 314 and the first spring lock 312 may slide together or separately along the first through hole 308, the opening of the valve stem 306, and the third through hole 311. The first spring lock 312 may include a T-shaped central portion and a spring coiled around the central portion. Similarly, the second locking mechanism may include a second, lower actuator axle 318 and a second, lower spring lock 316 coupled to a second, lower pin lock 317. The second actuator axle 318 may be positioned within the second through hole 310, and is slidable along the second through hole 310 in the direction of the x-axis. The second spring lock 316 may be positioned within an opening in the valve stem 306 in line with the second through hole 310 (along the x-axis). The second actuator axle 318 and the second spring lock 316 may slide together or separately along the second through hole 310 and the opening of the valve stem 306. The second spring lock 316 may include a T-shaped central portion and a spring coiled around the central portion. Even though the springs in the first spring lock 312 and the second spring lock 316 may be substantially identical, the central portion of the second spring lock 316 may be longer than that of the first spring lock 312. In one example, the spring of the first spring lock 312 may be coiled around a majority of the central portion and the spring of the second spring lock 316 may be coiled around less than half of the central portion.

In in the example of FIG. 3A, the CPS assembly is seen in a first configuration. In the first configuration, each of the first tappet cylinder 302 and the second tappet cylinder 304 is decoupled from the valve stem 306, and each of the first cam 356, 357 and the second cam 354, 355 may be deactivated. In this configuration, the engine cylinder may be deactivated and the valve associated with the valve stem 306 may not be opened and closed.

In the first configuration, the first actuator axle 314 of the first locking mechanism may be entirely confined within the first through hole 308 and the third through hole 311 and may not be inserted within the opening of the valve stem 306 housing the first spring lock 312. The first spring lock 312 may be entirely confined within the valve stem 306. In this way, the first locking mechanism does not lock (couple) the second tappet cylinder 304 to the valve stem 306. Also, in the first configuration, the second spring lock 316 may be confined within the opening in the valve stem 306 and a space between the valve stem 306 and the first tappet cylinder 302. In this position, any part of the second spring lock 316 may not be inserted within the second through hole 310 of the first tappet cylinder 302. The second actuator axle 318 may not be inserted within the opening of the valve stem 306 housing the second spring lock 316. In this way, the second locking mechanism does not lock (couple) the first tappet cylinder 302 to the valve stem 306. Each of the first spring 326 and the second spring 322 within the first tappet cylinder 302 and the second tappet cylinder 304, respectively, may hold the first tappet cylinder 302 and second tappet cylinder 304 in position.

FIG. 4A shows a cross-sectional view 400 of the CPS assembly of FIG. 3A taken along an x-y plane in a second configuration with a valve actuated by the valve stem 306 in an open position. FIG. 4B shows a cross-sectional view 450 of the CPS assembly of FIG. 3A in a second configuration with the valve actuated by the valve stem 306 in a closed position. The components introduced in FIG. 3A are numbered the same and not reintroduced in FIGS. 4A and 4B for brevity.

In the second configuration, the second tappet cylinder 304 is coupled to the valve stem 306 while the first tappet cylinder 302 is decoupled from the valve stem 306. In this configuration, the second cam 354 and 355 may be activated and the second tappet cylinder 304 may be used to actuate the valve associated with the valve stem 306. In order to actuate the valve via the second tappet cylinder 304, the second tappet cylinder 304 may be coupled to the valve stem 306 via the first locking mechanism. The first cam 356, 357 may remain inactive and may not be used to actuate the valve via the first tappet cylinder 302. The second locking mechanism may maintain the first tappet cylinder 302 independent of the valve stem 306 and the second tappet cylinder 304.

In the second configuration, the first spring lock 312 of the first locking mechanism is pushed along the positive x-axis axis to be at least partly inserted within the third through hole 311 of the second tappet cylinder 304 such that the first spring lock 312 spans across the opening of the valve stem 306 and the third through hole 311 within the second tappet cylinder 304. The spring in the first spring lock 312 may be compressed against an edge of the opening of the valve stem 306 as it is pushed along the positive x-axis. The first actuator axle 314 of the first locking mechanism may also be pushed along the positive x-axis and an end of the first actuator axle 314 may be in face sharing contact with the first spring lock 312 within the opening of the valve stem 306. The first upper pin lock 315 may be positioned within the third through hole 311. Furthermore, the second lower pin lock 317 may be positioned outside of the second through hole 310. Each of the first spring lock 312 and the first actuator axle 314 may span over the valve stem 306 and the second tappet cylinder 304. In this way, the valve stem 306 may be coupled to the second tappet cylinder 304 such that the valve stem 306 moves along with the second tappet cylinder 304.

Also, in the second configuration, the second spring lock 316 may be confined within the opening in the valve stem 306 and a space between the valve stem 306 and the first tappet cylinder 302. In this position, any part of the second spring lock 316 may not be inserted within the second through hole 310 of the first tappet cylinder 302. The second actuator axle 318 may not be inserted within the opening of the valve stem 306 housing the second spring lock 316. In this way, the second locking mechanism does not lock (couple) the first tappet cylinder 302 to the valve stem 306.

In the second configuration, the second tappet cylinder 304 and the valve stem 306 may move together while the first tappet cylinder 302 may move independently of the second tappet cylinder 304 and the valve stem 306. The springs 322 and 326 allow independent movement of the first and second tappet cylinders 302, 304 without contact. The larger width of the first through hole 308 allows relative motion between the first and second tappet cylinders 302, 304.

FIG. 4A shows the valve actuated by the valve stem 306 in an open position with VO1 illustrating a level of the valve opening. In order to open the valve, the lobe of the second cam 354 and 355 may press down on the second tappet cylinder 304 and consequently on the valve stem 306. The pressing down of the second tappet cylinder 304 may cause the second spring 322 positioned within a hollow part of the second tappet cylinder 304 to compress. The movement of the valve stem 306 may cause the valve to open. The degree of opening of the valve is based on the lift of the second cam 354, 355.

FIG. 4B shows the valve actuated by the valve stem 306 in a closed position. In the closed position, the lobe of the second cam 354 and 355 may no longer touch and press down on the second tappet cylinder 304 and consequently on the valve stem 306. The first cam 356, 357 may press down on the first tappet cylinder 302. However, as the first tappet cylinder 302 is not coupled to the valve stem 306, the pressing down of the first tappet cylinder 302 by the cam lobes does not cause the valve stem 306 to move, thereby maintaining the associated valve closed. As the first tappet cylinder 302 moves up and down along the y-axis, the first actuator axle 314 may remain stationary, wherein a range of movement may be defined by a width of the first through hole 308 along with a lobe shape of the second cam 354 and 355.

FIG. 5A shows a cross-sectional view 500 of the CPS assembly of FIG. 3A in a third configuration with a valve actuated by the valve stem 306 in a closed position. FIG. 5B shows a cross-sectional view 550 of the CPS assembly of FIG. 3A in a third configuration with the valve actuated by the valve stem 306 in an open position. The components introduced in FIG. 3A are numbered the same and not reintroduced in FIGS. 5A and 5B for brevity.

In the third configuration, the first tappet cylinder 302 is coupled to the valve stem 306 while the second tappet cylinder 304 is decoupled from the valve stem 306 via the first upper locking pin 315 being positioned outside of the third through hole 311. In this configuration, the first cam 356 and 357 may be activated and the first tappet cylinder 302 may be used to actuate the valve associated with the valve stem 306. In order to actuate the valve via the first tappet cylinder 302, the first tappet cylinder 302 may be coupled to the valve stem 306 via the second locking mechanism. In one example, the second lower locking pin 317 is positioned within the second through hole 310. The second cam 354, 355 may remain inactive and may not be used to actuate the valve via the second tappet cylinder 304. The first locking mechanism may maintain the second tappet cylinder 304 independent of the valve stem 306 and the first tappet cylinder 302.

In the third configuration, the second spring lock 316 of the second locking mechanism may be pushed along the positive x-axis axis to have the second lower locking pin 317 at least partly inserted within the second through hole 310 of the first tappet cylinder 302 such that the second spring lock 316 spans across the opening of the valve stem 306 and the second through hole 310 within the first tappet cylinder 302. The spring in the second spring lock 316 may be compressed against an edge of the opening of the valve stem 306 as it is pushed along the positive x-axis. The second actuator axle 318 of the second locking mechanism may also be pushed along the positive x-axis into the opening of the valve stem 306 housing the second spring lock 316, and an end of the second actuator axle 318 may be in face sharing contact with the second spring lock 316 within the opening of the valve stem 306. Each of the second spring lock 316 and the second actuator axle 318 may span over the valve stem 306 and the first tappet cylinder 302. In this way, the valve stem 306 may be coupled to the first tappet cylinder 302 such that the valve stem 306 moves along with the first tappet cylinder 302.

Also, in the third configuration, the first spring lock 312 may be confined within the opening in the valve stem 306. In this position, any part of the first spring lock 312 may not be inserted within the third through hole 311 of the second tappet cylinder 304. More specifically, the first upper locking pin 315 is outside of the third through hole 311. The first actuator axle 314 may not be inserted within the opening of the valve stem 306 housing the first spring lock 312. In this way, the first locking mechanism does not lock (couple) the second tappet cylinder 304 to the valve stem 306.

In the third configuration, the first tappet cylinder 302 and the valve stem 306 may move together while the second tappet cylinder 304 may move independently of the first tappet cylinder 302 and the valve stem 306. The springs 322 and 326 allow independent movement of the first and second tappet cylinders 302, 304 without contact. The larger width of the first through hole 308 allows relative option between the first and second tappet cylinders 302, 304.

FIG. 5A shows the valve actuated by the valve stem 306 in a closed position. In the closed position, the lobe of the first cam 356 and 357 may not touch and press down on the first tappet cylinder 302 and consequently on the valve stem 306. The second cam 354, 355 may press down on the second tappet cylinder 304. However, as the second tappet cylinder 304 is not coupled to the valve stem 306, the pressing down of the second tappet cylinder 304 by the cam lobes does not cause the valve stem 306 to move, thereby maintaining the associated valve closed. As the second tappet cylinder 304 moves up and down along the y-axis, the first actuator axle 314 may also move up and down, along the y-axis, within the first through hole 308.

FIG. 5B shows the valve actuated by the valve stem 306 in an open position with VO2 being the valve opening. In order to open the valve, the lobe of the first cam 356 and 357 may press down on the first tappet cylinder 302 and consequently on the valve stem 306. The pressing down of the first tappet cylinder 302 may cause the first spring 326 positioned within a hollow part of the first tappet cylinder 302 to compress. The movement of the valve stem 306 may cause the valve to open. The degree of opening of the valve is based on the lift of the first cam 356, 357. Since different cams were used in opening the same valve associated with the valve stem 306 in FIG. 4A and 5B, respectively, the degree of opening of the valve may be different (V01 may be different from V02) for the two configurations.

FIG. 6 shows a cross-sectional view 600 of the CPS assembly of FIG. 3A in a fourth configuration. The components introduced in FIG. 3A are numbered the same and not reintroduced in FIGS. 5A and 5B for brevity.

In the fourth configuration, each of the first tappet cylinder 302 and the second tappet cylinder 304 is coupled to the valve stem 306. In this configuration, each of the first cam 356, 357 and the second cam 354, 355 may be activated. Together the first tappet cylinder 302 and the second tappet cylinder 304 may be used to actuate the valve associated with the valve stem 306. Every time lobes of either of the first cam 356, 357 and the second cam 354, 355 pushes down on the first tappet cylinder 302 and second tappet cylinder 304, respectively, the valve may open. In order to actuate the valve via the first tappet cylinder 302, the first tappet cylinder 302 may be coupled to the valve stem 306 via the second locking mechanism and in order to actuate the valve via the second tappet cylinder 304, the second tappet cylinder 304 may be coupled to the valve stem 306 via the first locking mechanism. More specifically, the first upper locking pin 315 is positioned within the third through hole 311, thereby engaging the second tappet cylinder 304 with the valve stem 306. The second lower locking pin 317 is positioned within the second through hole 310, thereby engaging the first tappet cylinder 302 with the valve stem 306.

In the fourth configuration, the first spring lock 312 of the first locking mechanism is pushed along the positive x-axis axis to be at least partly inserted within the third through hole 311 of the second tappet cylinder 304 such that the first spring lock 312 spans across the opening of the valve stem 306 and the third through hole 311 within the second tappet cylinder 304. The spring in the first spring lock 312 may be compressed against an edge of the opening of the valve stem 306 as it is pushed along the positive x-axis. The first actuator axle 314 of the first locking mechanism may also be pushed along the positive x-axis and an end of the first actuator axle 314 may be in face sharing contact with the first spring lock 312 within the opening of the valve stem 306. Each of the first spring lock 312 and the first actuator axle 314 may span over the valve stem 306 and the second tappet cylinder 304. In this way, the valve stem 306 may be coupled to the second tappet cylinder 304 such that the valve stem 306 moves along with the second tappet cylinder 304.

Also, in the fourth configuration, the second spring lock 316 of the second locking mechanism may be pushed along the positive x-axis axis to be at least partly inserted within the second through hole 310 of the first tappet cylinder 302 such that the second spring lock 316 spans across the opening of the valve stem 306 and the second through hole 310 within the first tappet cylinder 302. The spring in the second spring lock 316 may be compressed against an edge of the opening of the valve stem 306 as it is pushed along the positive x-axis. The second actuator axle 318 of the second locking mechanism may also be pushed along the positive x-axis into the opening of the valve stem 306 housing the second spring lock 316, and an end of the second actuator axle 318 may be in face sharing contact with the second spring lock 316 within the opening of the valve stem 306. Each of the second spring lock 316 and the second actuator axle 318 may span over the valve stem 306 and the first tappet cylinder 302. In this way, the valve stem 306 may be coupled to the first tappet cylinder 302 such that the valve stem 306 moves along with the first tappet cylinder 302.

In this way, the components introduced in FIGS. 1-6 enable a system for an engine, comprising: an engine cylinder including at least one valve openable via a valve stem selectively actuated via two or more cam lobes coupled to a camshaft, a cam profile switch (CPS) assembly including a first, hollow cylinder, and a second, hollow cylinder enclosing each of the first tappet cylinder and the valve stem, and a first locking mechanism configured to independently couple the second tappet cylinder to the valve stem and a second locking mechanism configured to independently couple the first tappet cylinder to the valve stem, the first locking mechanism and the second locking mechanism configured to be engaged and disengaged independently.

Figure 7:
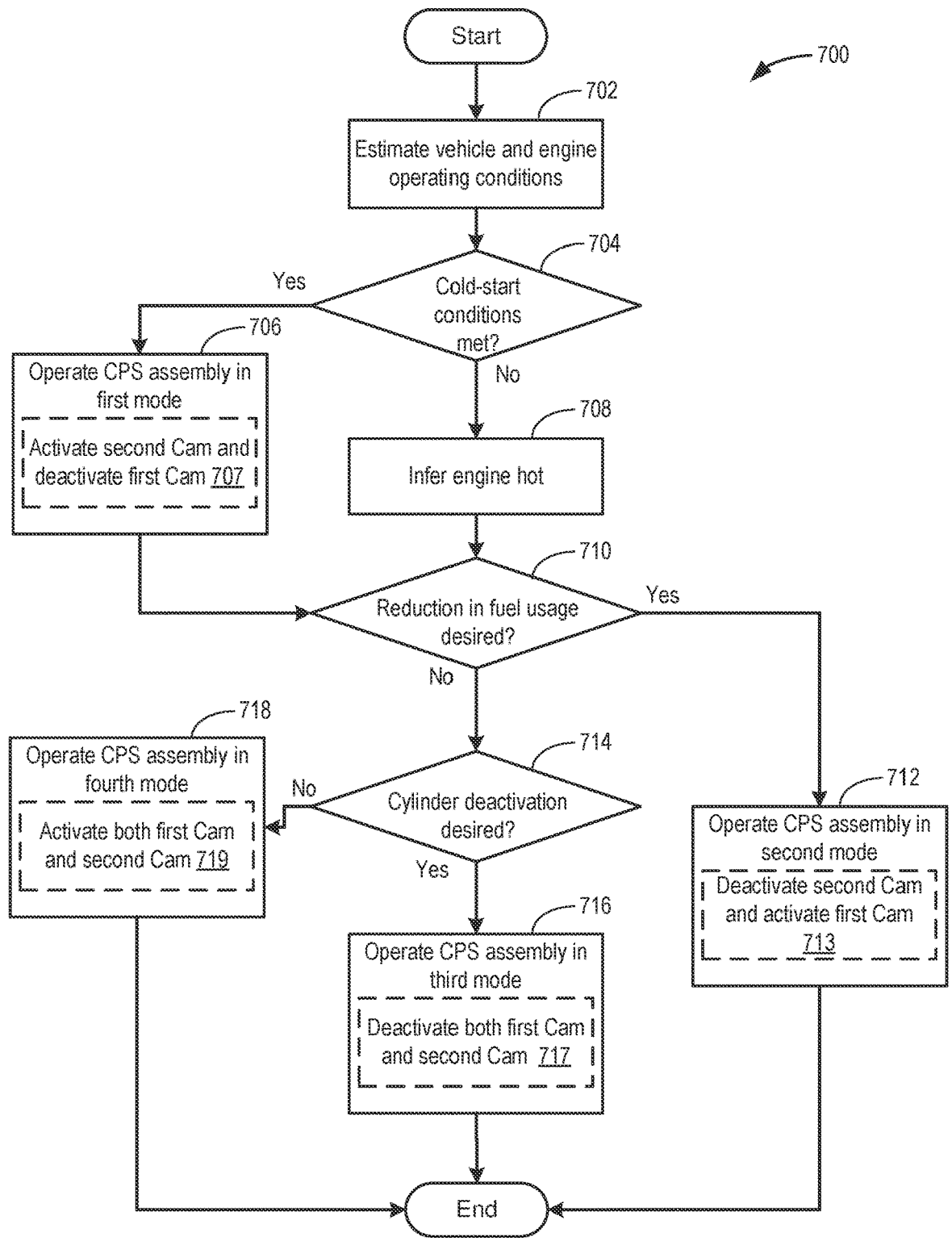
FIG. 7 shows a flowchart of an example method to operate the CPS assembly.

Referring now to FIG. 7, a method 700 for operating the CPS assembly of FIG.3. Instructions for carrying out method 700 may be executed by a controller (e.g. controller 12 of FIG. 1) based on instructions stored in a non-transitory memory of the controller and in conjunction with signals received from sensors of the engine system, such as the sensors described above with reference to FIG. 1. The controller may employ engine actuators of the engine system to adjust engine operation, according to the method described below.

Method 700 begins at 702 by estimating and/or measuring engine and vehicle operating conditions. Engine and vehicle operating conditions may include vehicle speed, engine speed and load, ambient humidity, ambient temperature, ambient pressure, MAF, a position of the throttle, torque demand, exhaust catalyst temperature, duration (or distance) elapsed since a last engine start, vehicle mode of operation (e.g., whether the vehicle is being operated in an electric mode, engine mode, or assist mode), etc.

At 704, the routine includes determining if cold-start conditions are met. Cold-start conditions may include a lower than threshold temperature of an exhaust catalyst (such as emissions control device 178 in FIG. 1) at engine start after a period of inactivity. The threshold temperature of the catalyst may correspond to the light-off temperature. Below the light-off temperature, the exhaust catalyst may not be able to effectively treat the reactive constituents of the exhaust gas. Engine cold-start may also be inferred based on a lower than threshold engine temperature and/or ambient temperature upon engine start. The catalyst temperature may be measured directly via a temperature sensor positioned therein or approximated via an engine temperature sensor.

If it is determined that cold-start conditions are met, it may be inferred that expedited heating of the exhaust gas may be desired. At 706, the CPS assembly may be operated in a first mode to increase exhaust heat generation.

Operation in the first mode includes, at 707, activating a second cam (such as cam 354, 355 in FIG. 3A) while deactivating a first cam (such as cam 356, 357). Operation of the CPS assembly may correspond to the second configuration of the CPS assembly as shown in FIGS. 4A and 4B. In the first mode, an inner, second tappet cylinder of a tappet of an engine valve system may engage with a valve stem, via a first locking mechanism, activating a valve of the engine valve system while an outer, first tappet cylinder of the tappet may remain decoupled from the valve stem via a second locking mechanism. In order to engage the second tappet cylinder to the valve stem, a first locking mechanism may slide along a first through hole in the first tappet cylinder, an opening in the valve stem, and a through hole in the second tappet cylinder to couple the second tappet cylinder to the valve stem while the first tappet cylinder is not coupled to the second tappet cylinder and/or the valve stem. Lobes of the active second cam may push down the second tappet cylinder and the lift from only the second cam may open the valve. Due to the first tappet cylinder being decoupled from the valve stem, movement of the first tappet cylinder due to rotation of the first cam may not affect the operation of the valve stem and the valve.

In one example, at the engine cold start, the second intake cam opens intake valves twice for 720 crank angles of an engine cycle. The second exhaust cam opens exhaust valves twice for each 720 crank angles of the engine cycle. The engine may be operated in a two-stroke mode. In one example, the two-stroke mode may differ from a traditional four stroke mode. The traditional four-stroke mode may include an intake stroke, a compression stroke, a combustion stroke, and an exhaust stroke, each spanning 180 CA. Fueling may occur during the intake and compression stroke, with spark being provided at an end of the compression stroke during the four-stroke mode. The two-stroke mode may include only the intake stroke and the exhaust stroke, wherein the intake stroke includes fueling prior to spark being provided near a transition from the intake stroke to the exhaust stroke. Following the exhaust stroke the intake stroke is repeated such that combustion occurs twice during a 720 CA engine cycle. By utilizing a two-stroke engine cycle during the cold-start, exhaust heat flux can be doubled due to doubled flow rate relative to four-stroke engine operation.

If it is determined that cold-start conditions are not present, at 708, it may be inferred that the engine is hot and expedited heating of exhaust gas may not be desired. Also, upon operating the engine in the first mode, upon the cold-start conditions being mitigated (such as catalyst attaining light-off) and the engine being warmed, the routine may proceed to step 710.

At 710, the routine includes determining if reduction in fuel usage is desired. Reduction in fuel usage may be desired during a condition when a level of fuel in the fuel tank is below a threshold level. If it is determined that reduction in fuel usage is desired, the routine may proceed to step 712.

At 712, the CPS assembly may be operated in a second mode to improve fuel efficiency. In the second mode for a hot engine where reduction in fuel usage is desired, the first intake camshaft opens the intake valves once for each engine cycle 720 CA. The first exhaust camshaft opens the exhaust valves once for each engine cycle 720 CA. This operation is a traditional 4-stroke engine cycle. By independently controlling the CPS modes, intake and exhaust valve duration and lift are independently specified depending on requirements, such as cold start exhaust heat flux as described above or warmed-up engine fuel economy. In the second mode, intake or exhaust valve durations may be longer or shorter than required for the first mode, and the number of intake or exhaust valve openings may be one or multiple openings for each 720 CA engine cycle. This allows a broad range of control to trap exhaust gas residuals in the cylinder depending on the intake and exhaust valve opening and closing timings, and/or a range of control to minimize the amount of throttling and adjust the volumetric efficiency of the engine so that the pressure of the intake air is maintained near the pressure of the exhaust system in order to minimize engine pumping losses.

Operation in the second mode includes, at 713, deactivating the second cam while activating the first cam. Operation of the CPS assembly in the second mode may correspond to the third configuration of the CPS assembly as shown in FIGS. 5A, B. In the second mode, the second tappet cylinder of the tappet may engage with the valve stem, via a first locking mechanism, activating the valve of the engine valve system while the first tappet cylinder of the tappet may remain decoupled from the valve stem. In order to engage the first tappet cylinder to the valve stem, a second locking mechanism may slide along a second through hole in the first tappet cylinder and another opening in the valve stem to couple the first tappet cylinder to the valve stem while the second tappet cylinder is not coupled to the first tappet cylinder and/or the valve stem. Lobes of the active first cam may push down the first tappet cylinder and the lift from only the first cam may open the valve. Due to the second tappet cylinder being decoupled from the valve stem, movement of the second tappet cylinder due to rotation of the second cam may not affect the operation of the valve stem and the valve.

If at 710, it is determined that reduction in fuel usage is not desired, the routine may proceed to step 714. At 714, the method includes determining if cylinder deactivation is desired. Cylinder deactivation may be desired during lower than threshold engine load conditions when combustion at all engine cylinders may not be desired. During such low load conditions one or more engine cylinders may be selectively deactivated.

If it is determined that deactivation of the engine cylinder is desired, at 716, the CPS assembly may be operated in a third mode. Operation in the third mode includes, at 717, deactivating both the second cam and the first cam. Operation of the CPS assembly in the third mode may correspond to the first configuration of the CPS assembly as shown in FIG. 3A. In the third mode, each of the first tappet cylinder and the second tappet cylinder may be decoupled from the valve stem by actuation of the first and second locking mechanisms. In order to disengage each of the first tappet cylinder and the second tappet cylinder to the valve stem, the first locking mechanism may decouple the second tappet cylinder from the valve stem while the second locking mechanism may decouple the first tappet cylinder from the valve stem. Since the valve stem is not connected to any of the cylinders, pushing down of either cylinder by the cam lobes may not cause the valve stem to move and open/close the associated valve. In this way, the valve may be maintained in a closed position and the engine cylinder may be deactivated.

If it is determined that deactivation of the engine cylinder is not desired, and it was previously inferred that the engine is hot, the routine may proceed to step 718. At 718, the CPS assembly may be operated in a fourth mode. Operation in the fourth mode includes, at 717, activating both the second cam and the first cam. Operation of the CPS assembly in the fourth mode may correspond to the fourth configuration of the CPS assembly as shown in FIG. 6. In the fourth mode, each of the first tappet cylinder and the second tappet cylinder may be coupled to the valve stem by actuation of the first and second locking mechanisms. In order to engage each of the first tappet cylinder and the second tappet cylinder to the valve stem, the first locking mechanism may slide along the first through hole in the first tappet cylinder, the opening in the valve stem, and the through hole in the second tappet cylinder to couple the second tappet cylinder to the valve stem, and the second locking mechanism may slide along the second through hole in the first tappet cylinder and another opening in the valve stem to couple the first tappet cylinder to the valve stem. Lobes of the active first cam may push down the first tappet cylinder and the lift from the first cam may open the valve and then lobes of the active second cam may push down the second tappet cylinder and the lift from the second cam may open the valve. In this way, the valve may be opened successively by both the first and second cams.

In this way, by including two different locking mechanism in the CPS assembly, it is possible to independently couple one or both cylinders to the valve stem. By independently activating each cam, it is possible to operate the CPS assembly in four different modes based on engine operating conditions. The technical effect of including springs within cutouts in the cylinder and forming through holes in the cylinders is that each cylinder is able to move without affecting the other cylinder if they are not coupled together. Overall, by adjusting cam profile and valve lift based on engine operating condition, improved engine operation such as expedited exhaust catalyst heating may be achieved.

An example system for a cam profile switch (CPS) assembly comprises: a first tappet cylinder and a second tappet cylinder independently coupleable to a valve stem via two locking mechanisms, and a first cam configured to engage with the first tappet cylinder and a second cam configured to be engaged with the second tappet cylinder. In any of the preceding examples, additionally or optionally, each of the first tappet cylinder and the second tappet cylinder are hollow and the valve stem is coupled to an intake valve or an exhaust valve of an engine cylinder. In any or all of the preceding examples, additionally or optionally, the valve stem, the first tappet cylinder, and the second tappet cylinder are concentric with a first diameter of the first tappet cylinder being larger than a second diameter of the second tappet cylinder, the second tappet cylinder enclosing the valve stem, and the first tappet cylinder enclosing each of the second tappet cylinder and the valve stem. In any or all of the preceding examples, additionally or optionally, the two locking mechanisms include a first locking mechanism configured to couple the second tappet cylinder to the valve stem and a second locking mechanism configured to couple the first tappet cylinder to the valve stem. In any or all of the preceding examples, additionally or optionally, the first locking mechanism includes a first actuator axle slidable along a first through hole in the first tappet cylinder and a first spring lock slidable along a first opening in the valve stem and a through hole in the second tappet cylinder. In any or all of the preceding examples, additionally or optionally, the second locking mechanism includes a second actuator axle slidable along a second through hole in the first tappet cylinder and a second spring lock slidable along a second opening in the valve stem and the second through hole in the first tappet cylinder. In any or all of the preceding examples, the system further comprises, additionally or optionally, a first, lower disc and a second, upper disc coupled to the valve stem, the first disc configured to support a first spring housed within a first cutout in the first tappet cylinder and the second disc configured to support a second spring housed within a second cutout in the second tappet cylinder. In any or all of the preceding examples, additionally or optionally, the first cam includes two cam lobes of a first lift profile and the second cam includes two cam lobes of a second lift profile.

Another example method for a cam profile switch (CPS) assembly, comprises: during a first condition, operating the CPS assembly in a first mode with only a second tappet cylinder coupled to a valve stem, a first tappet cylinder decoupled from the valve stem, and a second cam active, and during a second condition, operating the CPS assembly in a second mode with only the first tappet cylinder coupled to the valve stem, the second tappet cylinder decoupled from the valve stem, and a first cam active. In any of the preceding examples, additionally or optionally, the first condition includes a cold-start condition and the second condition includes a desire for increased fuel efficiency. In any or all of the preceding examples, additionally or optionally, during the first condition, a lift from the second cam pushes down only the second tappet cylinder and the valve stem to open a valve coupled to the valve stem, and wherein during the second condition, another lift from the first cam pushes down only the first tappet cylinder and the valve stem to open the valve. In any or all of the preceding examples, additionally or optionally, during the first condition, a first locking mechanism slides along a first through hole in the first tappet cylinder, an opening in the valve stem, and a through hole in the second tappet cylinder to couple the second tappet cylinder to the valve stem while the first tappet cylinder is not coupled to the second tappet cylinder and/or the valve stem. In any or all of the preceding examples, additionally or optionally, during the second condition, a second locking mechanism slides along a second through hole in the first tappet cylinder and another opening in the valve stem to couple the first tappet cylinder to the valve stem while the second tappet cylinder is not coupled to the first tappet cylinder and/or the valve stem. In any or all of the preceding examples, additionally or optionally, each of the first locking mechanism and the second locking mechanism includes an actuator axle and a spring lock slidable along a plane. Any or all of the preceding examples, further comprising, additionally or optionally, during a third condition, operating the CPS assembly in a third mode with each of the first tappet cylinder and the second tappet cylinder decoupled from the valve stem, and during a fourth condition, operating the CPS assembly in a fourth mode with each of the first tappet cylinder and the second tappet cylinder coupled to the valve stem. In any or all of the preceding examples, additionally or optionally, the third condition includes a request for deactivation of the engine cylinder including the valve stem, and the fourth condition includes a higher than threshold engine temperature. In any or all of the preceding examples, additionally or optionally, during the third condition, each of the first cam and the second cam is inactive and the valve stem is not pushed down by the first cam or the second cam, and during the fourth condition, each of the first cam and the second cam is active and the valve stem is pushed down successively by each the first cam of the second cam. In any or all of the preceding examples, additionally or optionally, during the third condition, the first locking mechanism decouples the second tappet cylinder from the valve stem while the second locking mechanism decouples the first tappet cylinder from the valve stem, and wherein during the fourth condition, the first locking mechanism slides along the first through hole in the first tappet cylinder, the opening in the valve stem, and the through hole in the second tappet cylinder to couple the second tappet cylinder to the valve stem, and the second locking mechanism slides along the second through hole in the first tappet cylinder and another opening in the valve stem to couple the first tappet cylinder to the valve stem.

Yet another example system for an engine, comprises: an engine cylinder including at least one valve openable via a valve stem selectively actuated via two or more cam lobes coupled to a camshaft, a cam profile switch (CPS) assembly including a first, hollow cylinder, and a second, hollow cylinder enclosing each of the first tappet cylinder and the valve stem, and a first locking mechanism configured to independently couple the second tappet cylinder to the valve stem and a second locking mechanism configured to independently couple the first tappet cylinder to the valve stem, the first locking mechanism and the second locking mechanism configured to be engaged and disengaged independently. In any of the preceding examples, additionally or optionally, the first locking mechanism includes a first actuator axle slidable along a first through hole in the first tappet cylinder and a first spring lock slidable along a first opening in the valve stem and a through hole in the second tappet cylinder, and wherein the second locking mechanism includes a second actuator axle slidable along a second through hole in the first tappet cylinder and a second spring lock slidable along a second opening in the valve stem and the second through hole in the first tappet cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a cam profile switch (CPS) assembly, the system comprising:
 a first tappet cylinder;
 a second tappet cylinders;
 a first cam configured to engage the first tappet cylinder;
 a second cam configured to engage a second tappet cylinder;
 a first locking mechanism configured to selectively and independently couple the second tappet cylinder to a valve stem; and
 a second locking mechanism configured to selectively and independently couple the first tappet cylinder to the valve stein, wherein the first locking mechanism includes a first spring lock configured to slide along a first opening in the valve stem and a third through hole in the second tappet cylinder, and wherein the second locking mechanism includes a second spring lock configured to slide along a second opening in the valve stem and a second through hole in the first tappet cylinder.

2. The system of claim 1, wherein the first tappet cylinder and the second tappet cylinder are hollow and the valve stem is coupled to a gas exchange valve of an engine cylinder.

3. The system of claim 1, wherein the first tappet cylinder, and the second tappet cylinder, and the valve stem are concentrically arranged such that the first tappet cylinder encircles the second tappet cylinder, and the second tappet cylinder encircles the valve stem.

4. The system of claim 1, wherein the first locking mechanism further includes a first actuator axle configured to slide along a first through hole in the first tappet cylinder, and
wherein the second locking mechanism further includes a second actuator axle configured to slide along the second through hole in the first tappet cylinder.

5. The system of claim 1, further comprising;
a lower disc coupled to the valve stem, the lower disc configured to support a first spring housed within a first cutout in the first tappet cylinder; and
an upper disc coupled to the valve stem, the upper disc configured to support a second spring housed within a second cutout in the second tappet cylinder.

6. The system of claim 1, wherein the first cam includes two cam lobes of a first lift profile, and
wherein the second cam includes two cam lobes of a second lift profile.

7. A method for operating a cam profile switch (CPS) assembly including a first tappet cylinder and a second tappet cylinder, the method comprising:
during a first condition, operating the CPS assembly in a first mode in which the first tappet cylinder is decoupled from a valve stem, the second tappet cylinder is coupled to the valve stem, and a second cam is active; and
during a second condition, operating the CPS assembly in a second mode in which the first tappet cylinder is coupled to the valve stem, the second tappet cylinder is decoupled from the valve stem, and a first cam is active.

8. The method of claim 7, wherein the first condition includes a condition in which an engine temperature is greater than a predetermined temperature.

9. The method of claim 7, wherein during the first condition, a lift from the second cam pushes down only the second tappet cylinder and the valve stem so as to open a valve coupled to the valve stem, and
wherein during the second condition, lift from the first cam pushes down only the first tappet cylinder and the valve stem so as to open the valve.

10. The method of claim 7, wherein during the first condition, a first locking mechanism slides along a first through hole in the first tappet cylinder, a first opening in the valve stem, and a third through hole in the second tappet cylinder so as to couple the second tappet cylinder to the valve stem.

11. The method of claim 10, wherein during the second condition, a second locking mechanism slides along a second through hole in the first tappet cylinder and a second opening in the valve stem so as to couple the first tappet cylinder to the valve stem.

12. The method of claim 11, wherein the first locking mechanism and the second locking mechanism each include an actuator axle and a spring lock configured to slide along a respective plane.

13. The method of claim 11, further comprising, during a third condition, operating the CPS assembly in a third mode in which the first tappet cylinder and the second tappet cylinder are decoupled from the valve stem, and
during a fourth condition, operating the CPS assembly in a fourth mode in which the first tappet cylinder and the second tappet cylinder are coupled to the valve stem.

14. The method of claim 13, wherein the valve stem is associated with an engine cylinder,
wherein the third condition includes a request for deactivation of the engine cylinder, and
wherein the fourth condition includes a condition in which an engine temperature is greater than a threshold engine temperature.

15. The method of claim 13, wherein during the third condition, the first cam and the second cam are inactive such that the valve stem is not pushed down by either of the first cam or the second cam, and during the fourth condition, the first cam and the second cam are active such that the valve stem is pushed down successively by the first cam and the second cam.

16. The method of claim 13, wherein during the third condition, the first locking mechanism decouples the second tappet cylinder from the valve stem, and the second locking mechanism decouples the first tappet cylinder from the valve stem.

17. A system for an engine, the system comprising:
an engine combustion chamber including at least one valve configured to open via a valve stem selectively actuated via two or more cam lobes coupled to a camshaft;
a cam profile switch (CPS) assembly including a first tappet cylinder and a second tappet cylinder concentrically arranged with respect to the valve stem such that the first tappet cylinder encircles the second tappet cylinder, and the second tappet cylinder encircles the valve stem;
a first locking mechanism configured to selectively and independently couple the second tappet cylinder to the valve stem; and
a second locking mechanism configured to selectively and independently couple the first tappet cylinder to the valve stem,
wherein the first locking mechanism includes a first actuator axle configured to slide along a first through hole in the first tappet cylinder, and a first spring lock configured to slide along a first opening in the valve stem and a third through hole in the second tappet cylinder, and
wherein the second locking mechanism includes a second actuator axle configured to slide along a second through hole in the second tappet cylinder, and a second spring lock configured to slide along a second opening in the valve stem and the second through hole.

* * * * *